United States Patent
Kim et al.

(10) Patent No.: US 9,118,254 B2
(45) Date of Patent: Aug. 25, 2015

(54) DC-DC CONVERTER UTILIZING OUTPUT POWER TO TURN OFF SWITCHES

(71) Applicants: LSIS CO., LTD., Anyang-si, Gyeonggi-do (KR); Seoul National University R&DB Foundation, Seoul (KR)

(72) Inventors: Woo Sup Kim, Seoul (KR); Jae Ho Lee, Bucheon-si (KR); Chun Suk Yang, Seongnam-si (KR); Seoung Woon Lee, Seoul (KR); Bo Hyung Cho, Seoul (KR)

(73) Assignees: LSIS Co., Ltd., Anyang-Si, Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 158 days.

(21) Appl. No.: 13/932,943

(22) Filed: Jul. 1, 2013

(65) Prior Publication Data
US 2014/0104891 A1    Apr. 17, 2014

(30) Foreign Application Priority Data
Oct. 15, 2012 (KR) .......... 10-2012-0114419

(51) Int. Cl.
*H02M 7/217* (2006.01)
*H02M 3/335* (2006.01)
*H02M 3/337* (2006.01)

(52) U.S. Cl.
CPC .......... *H02M 3/33569* (2013.01); *H02M 3/337* (2013.01)

(58) Field of Classification Search
CPC ....... H02M 3/22; H02M 3/285; H02M 3/335; H02M 3/3353; H02M 3/33507; H02M 3/33569; H02M 3/33538
USPC .............. 363/16, 17, 20, 21.01, 21.02, 21.03, 363/21.04, 21.12, 89, 124, 125, 127
See application file for complete search history.

(56) References Cited

U.S. PATENT DOCUMENTS

| 2004/0145928 | A1* | 7/2004 | Takada ............................ 363/95 |
| 2004/0233690 | A1* | 11/2004 | Ledenev et al. ................ 363/133 |
| 2005/0226008 | A1* | 10/2005 | Harada et al. ................... 363/15 |
| 2007/0297204 | A1* | 12/2007 | Lu et al. ......................... 363/131 |
| 2010/0225289 | A1* | 9/2010 | Chang ............................ 323/282 |
| 2011/0221482 | A1* | 9/2011 | Kim et al. ...................... 327/109 |
| 2013/0083563 | A1* | 4/2013 | Wang et al. ..................... 363/17 |

* cited by examiner

*Primary Examiner* — Jeffrey Gblende
(74) *Attorney, Agent, or Firm* — Lee, Hong, Degerman, Kang & Waimey

(57) ABSTRACT

Disclosed is a DC-DC converter. The DC-DC converter includes a power input unit to which power is applied, a first module comprising a first transformer and a second transformer to output a first output power transformed according to operations of a first switch and a second switch connected with the first transformer and the second transformer by using the applied power, a second module comprising a third transformer and a fourth transformer to output a second output power transformed according to operations of a third switch and a fourth switch connected with the third transformer and the fourth transformer by using the applied power, an output unit to output a sum of the first output power and the second output power, and a controller to control an interleaving operations between the first module and the second module.

14 Claims, 4 Drawing Sheets

DC-DC CONVERTER UTILIZING OUTPUT POWER TO TURN OFF SWITCHES

CROSS-REFERENCE TO RELATED APPLICATIONS

Pursuant to 35 U.S.C. §119(a), this application claims the benefit of earlier filing date and right of priority to Korean Patent Application No. 10-2012-0114419, filed on Oct. 15, 2012, the contents of which is incorporated by reference herein in its entirety.

BACKGROUND

The embodiment relates to a DC-DC converter and a method of operating the same. More particularly, the embodiment relates to a DC-DC converter, capable of improving switching performance and switching efficiency with the reduced volume and the reduced cost, and a method of operating the same.

As industries have been developed and new generation energy has been extensively supplied, studies and research on high-capacity DC-DC converters (DC power converting devices) have been actively carried out. The high-capacity DC-DC converters have been variously applied to a power supply, a low-voltage/high-capacity conversion device, or a high-voltage conversion device in the fields such as broadcasting communication appliances, OA appliances, industrial electronic appliances, micro-computers, and ozone apparatuses.

In addition, generally, pollution-free vehicles using electricity employ DC-DC converters in order to greatly improve the efficiency of systems, and an insulating function is necessarily required for the safety. In particular, the required power capacity of the electronic units is increased with the advance of a battery technology and the increase of power required in a vehicle. The input/output voltage of a DC-DC power device such as an OBC (on-board charger) or an LDC (low voltage DC-DC converter) is set to a specific voltage (grid voltage or battery voltage). Accordingly, the increase of the power capacity may refer to the increase of input/output current. Since the performance of the charging electronic units directly exert an influence on electricity charges or the driving distance of a vehicle, the high-performance DC-DC power device having a high capacity-high current characteristic has been required.

The DC-DC converter employs various converters such that the DC-DC converter is highly integrated and represents high efficiency while operating in a wide input/output voltage and current range. In particular, a zero-voltage or zero-current switching scheme has been used to reduce switching loss and switching stress by switching a switch at zero-voltage or zero current.

FIG. 1 is a circuit diagram showing a phase-shifted full-bridge (PSFB) converter.

Referring to FIG. 1, a phase-shifted full-bridge converter may include an input unit 11 connected with a battery or an AC-DC PFC output terminal, a switch unit 12 to convert DC input to AC input, a transformer 13 to perform transformation based on an insulating ratio and the ratio of transformation, a rectifying unit 14 to convert AC voltage into DC voltage, a filter unit 15 to smooth voltage, and an output unit 16 for connection of the battery.

Hereinafter, the operation of a typical phase-shifted full-bridge converter of FIG. 1 will be described with reference to FIG. 2.

During a half-period, the PSFB converter applies voltage to a transformer by conducting an upper switch S1 having a leading leg and a lower switch S4 having a lagging leg. The PSFB converter adjusts a voltage ratio by adjusting the phase for overlapping period of the switches S1 and S4 differently from a conventional full-bridge converter to convert the voltage ratio by adjusting a duty ratio. That is to say, in the PSFB converter, the soft switching of each switch can be implemented by using phase adjustment, which representing improved efficiency as compared with a conventional scheme.

The PSFB circuit has been implemented in most products in the high capacity DC-DC converter. The RSPB allows the soft switching of all switches by using a simple control scheme (phase angle control scheme). However, the soft switching of the lagging-leg switch cannot be implemented in a light load.

In addition, although the soft switching can be implemented by using the output current in the case of the leading-leg switch, zero-voltage switching must be performed by using only circulating current at a primary side. Accordingly, resonance energy is insufficient in the light load.

Further, in the case of a wide input voltage range, energy shortage is represented in high-voltage input, so that efficiency can be degraded. In order to prevent the above phenomenon, an inductor may be inserted between a switch unit and a transformer unit. However, the transition time of secondary current is reduced, and the effective conductive ratio is reduced.

Meanwhile, although the inductor of the filter unit is required in order to reduce current ripples, the conduction loss is increased by winding in the case of high-current output. Since a large core must be used in order to prevent magnetic saturation, the increase of the volume and the weight is caused.

SUMMARY

The present embodiment provides a DC-DC converter capable of solving the problem of the related art that does not achieve zero-voltage switching in a light load.

The present embodiment provides a DC-DC converter capable of solving the problem in the high-current output type and capable of overcoming the problems related to the size and the efficiency caused by a filter inductor by removing an output inductor.

The present embodiment provides a DC-DC converter capable of increasing zero-voltage switching efficiency in high-current output, and capable of reducing output current ripples.

According to the embodiment, there is provided a DC-DC converter including a power input unit to which power is applied, a first module comprising a first transformer and a second transformer to output a first output power transformed according to operations of a first switch and a second switch connected with the first transformer and the second transformer by using the applied power, a second module comprising a third transformer and a fourth transformer to output a second output power transformed according to operations of a third switch and a fourth switch connected with the third transformer and the fourth transformer by using the applied power, an output unit to output a sum of the first output power and the second output power, and a controller to control an interleaving operations between the first module and the second module.

According to the embodiment, there is provided a DC-DC converter including a power input unit to which a DC power is applied, a first switch having one terminal connected with a positive terminal of the power input unit, and an opposite terminal connected with a second switch connected with a negative electrode of the power input unit, a third switch having one terminal connected with the positive terminal of the power input unit, and an opposite terminal connected with a fourth switch connected with the negative electrode of the power input unit, a first transformer, a second transformer, a fourth transformer, and a third transformer having input coils connected in series between a first connection point, at which the first switch and the second switch are connected with other, and a second connection point at which the third switch and the fourth switch are connected with each other, and an output unit to output converted DC power.

DETAILED DESCRIPTION OF THE EMBODIMENTS

Figure 1:
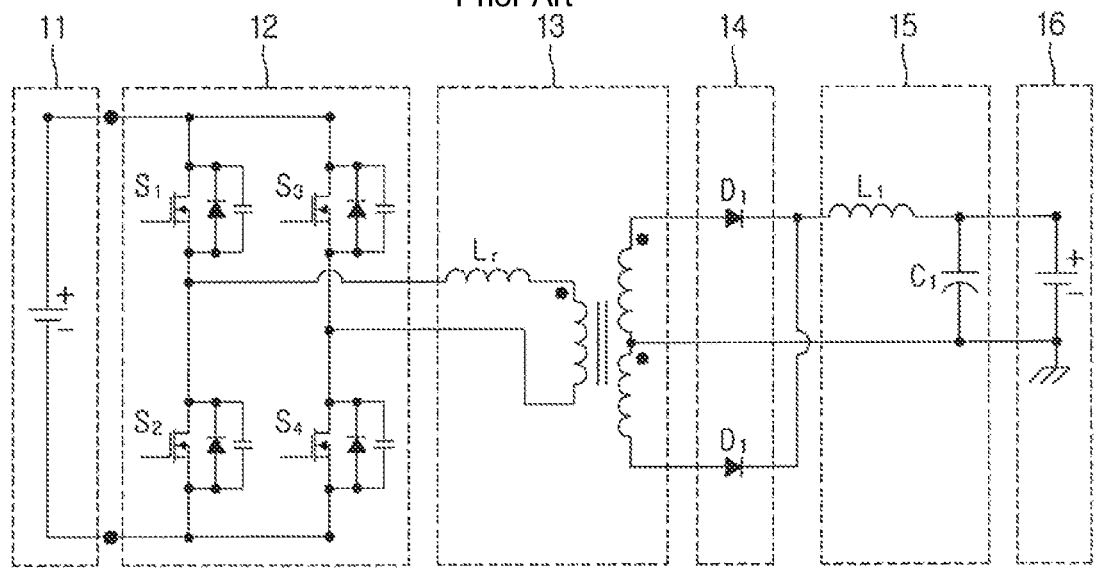
FIG. 1 is a circuit diagram showing a phase-shifted full-bridge converter according to the related art.
Figure 2:
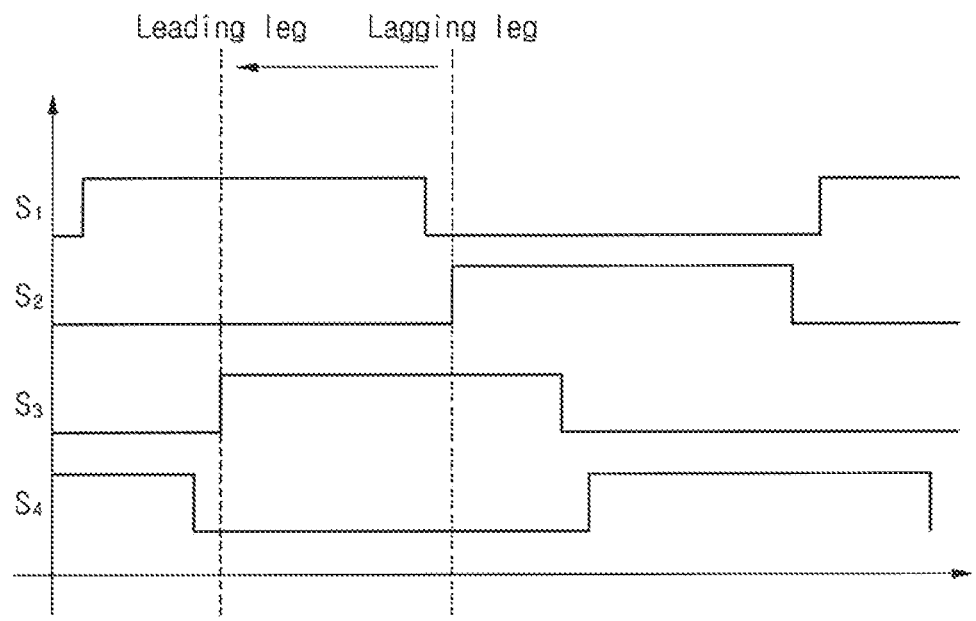
FIG. 2 is a view to explain the operation of a typical phase-shifted full-bridge converter.

Terms and words used in the specification and the claims shall not be interpreted as commonly-used dictionary meanings, but shall be interpreted as to be relevant to the technical scope of the invention based on the fact that the inventor may properly define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

Figure 3:
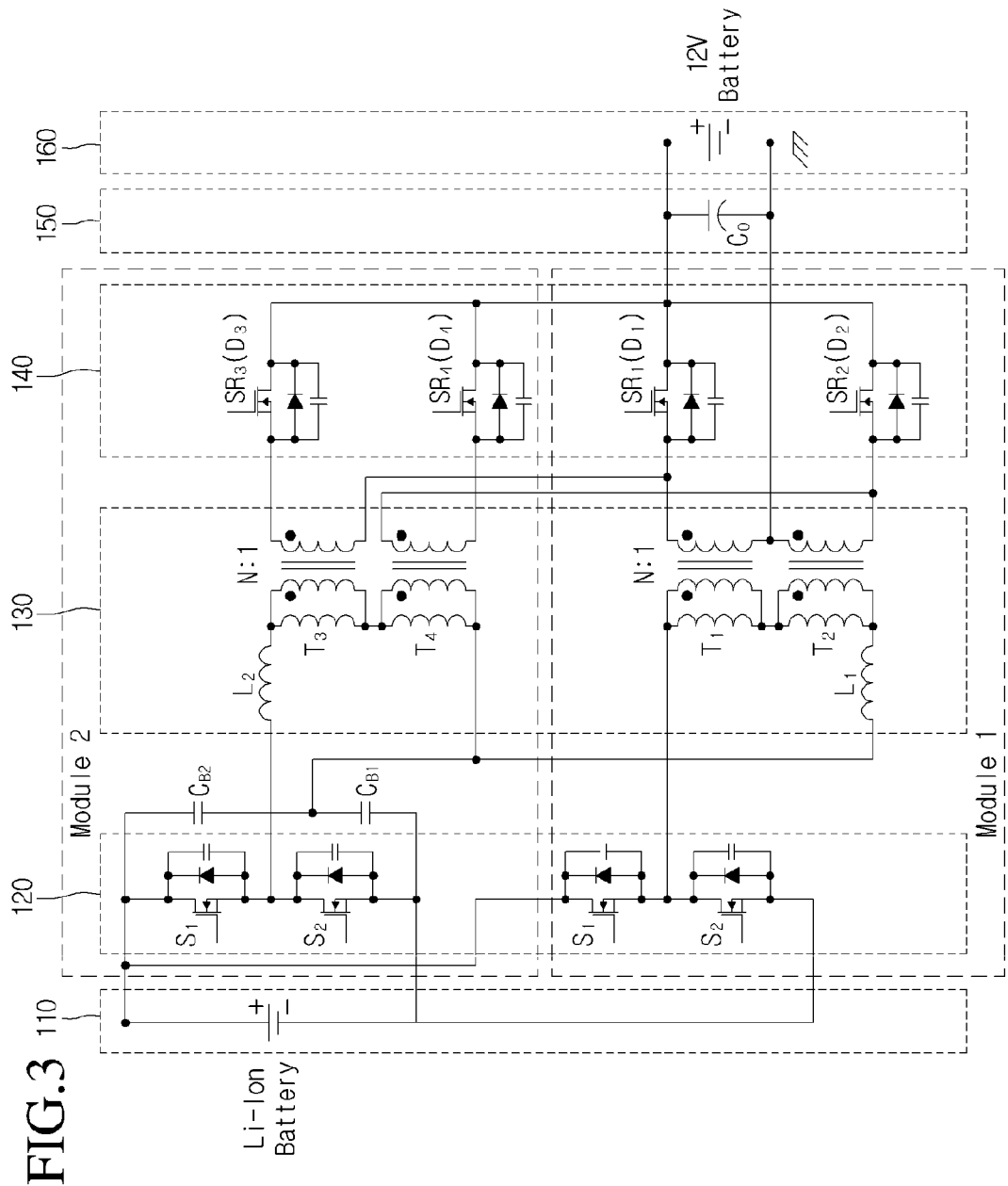
FIG. 3 is a circuit diagram showing a DC-DC converter according to one embodiment.

FIG. 3 is a circuit diagram illustrating a DC-DC converter according to the embodiment.

Referring to FIG. 3, a DC-DC converter according to the embodiment includes a power input unit 110, to which power is applied, a switching unit 120 to switch the applied power, a transformer unit 130 to transform voltage according to the switched power input, a rectifying unit 140 to rectify the transformed power, a filter unit 150 to filter the rectified power, and an output unit to output the filtered power.

In this case, the switching unit 120 may include a first switch S1, a second switch S2, a third switch S3, and a fourth switch S4.

In addition, the transformer unit 130 may include a first transformer T1, a second transformer T2, a third transformer T3, and a fourth transformer T4.

Further, the rectifying unit 140 may include a first rectifying unit D1, a second rectifying unit D2, a third rectifying unit D3, and a fourth rectifying unit D4.

According to one embodiment, one terminal of the first switch S1 may be connected with a positive electrode of the power input unit 110, and one terminal of the second switch S2 may be connected with a negative electrode of the power input unit 110. An opposite terminal of the first switch S1 may be connected with an opposite terminal of the second switch S2.

In addition, according to one embodiment, one terminal of the third switch S3 may be connected with the positive electrode of the power input unit 110, and one terminal of the fourth switch S4 may be connected with the negative electrode of the power input unit 110. An opposite terminal of the third switch S3 may be connected with an opposite terminal of the fourth switch S4.

In the first transformer T1, the second transformer T2, the fourth transformer T4, and the third transformer T3, input coils may be sequentially connected in series between a first connection point, at which the first switch S1 and the second switch S2 are connected with each other, and a second connection point at which the third switch S3 and the fourth switch S4 are connected with each other.

In addition, output coils of the first transformer T1, the second transformer T2, and the fourth transformer T4 may be connected with both terminals of the filter unit 150 and the output unit 160 through the first rectifying unit D1, the second rectifying unit D2, the fourth rectifying unit D4, and the third rectifying unit D3.

Although not shown in FIG. 3, the DC-DC converter according to one embodiment control the switching operation of the switches S1 to S3, which are connected described above, so that the switches S1 to S3 perform that zero-value switching.

Accordingly, a portion of FIG. 3 may serve the module second module in order to describe the operation of the D-DC converter according to the embodiment having the above structure.

The first module may include the first and second transformers T1 and T2, the first and second switches S1 and S2, and the first and second rectifiers D1 and D2. The first module transforms and rectifies the applied voltage thereto in the operation of the first switch S1 and the second switch S2 and may output first output power to the output unit 160.

The second module may include the third and fourth transformers T3 and T4, the third and fourth switches S3 and S4, and the third and fourth rectifiers D3 and D4. The second module transforms and rectifies applied power in the operation of the third and fourth switches S3 and S4, so that second output power may be output to the output unit 160.

In this case, the output unit 160 may be output the sum of the first and second output powers to an external connected DC power device. For example, the DC power device may include a charging device for a battery, a charging device for a charging station, an OBC, or an LDC circuit, but the embodiment is not limited thereto.

The controller performs an interleaving operation between the first module and the second module to achieve zero voltage switching or zero current switching. In addition, the controller controls the two transforms to alternately operate so that each transformer serves as a filter inductor by using power transmission and magnetizing inductor. Accordingly, the design of the filter unit 150 employing only a low-capacity capacitor is possible. In addition, in the design of a transformer, the performance degradation resulting from the parameter increase and the deviation in the design of the transformer can be reduced.

Hereinafter, the operation of the DC-DC converter circuit of FIG. 3 will be described with reference to FIG. 4.

Figure 4:
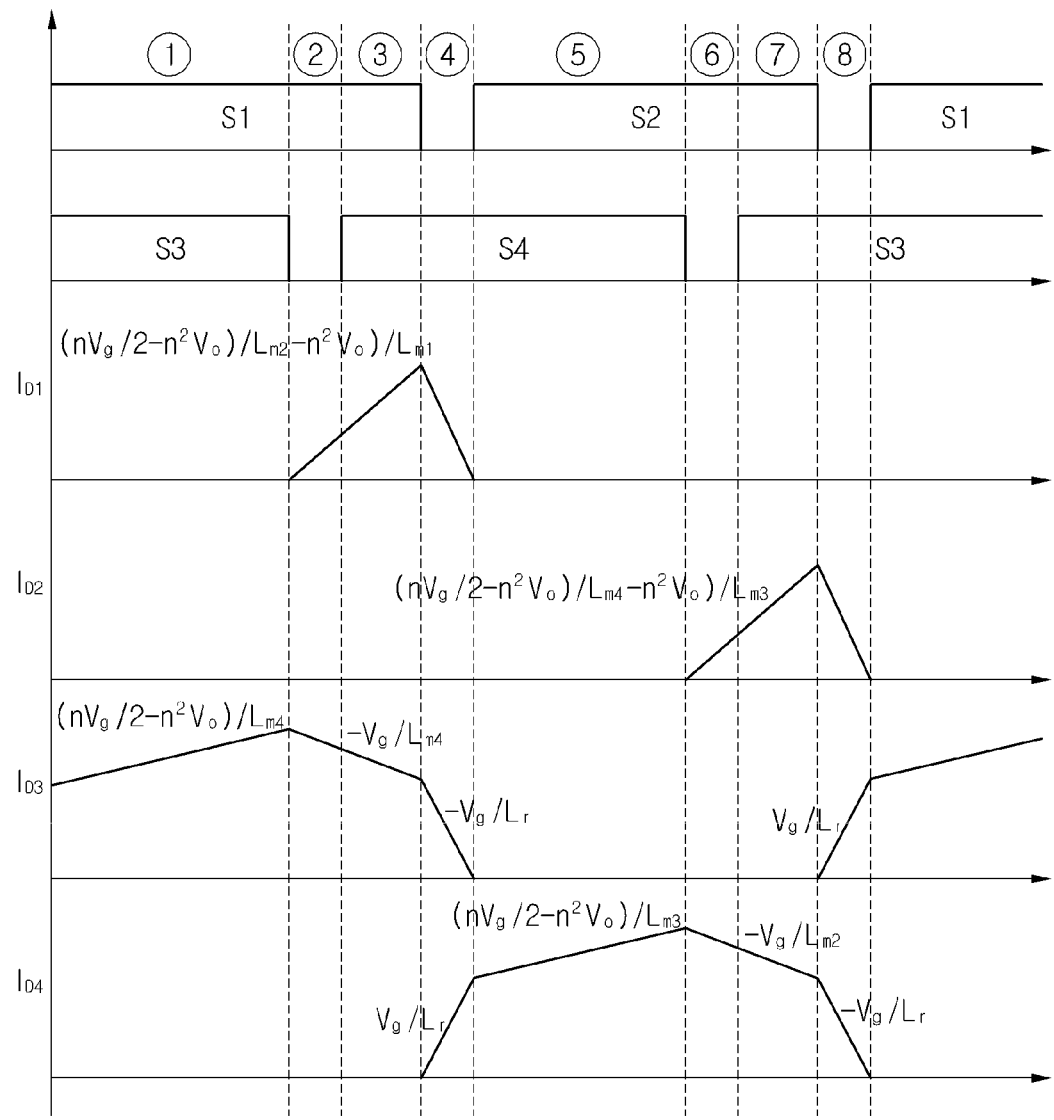
FIG. 4 is a timing diagram showing the switching operation of the DC-DC converter and the waveform of output current according to one embodiment.

Referring to FIGS. 3 to 4, if power is applied to power input unit 110, the controller controls the first switch S1 and the third switch S3 to be turned on, and controls the second switch S2 and the fourth switch S4 to be turned off.

Accordingly, current is applied to the first transformer T1 and the third transformer T3 connected with the first switch S1 and the third switch S3, respectively, so that a transform operation can be performed. In addition, power transformed at the first transformer T1 and the third transformer T3 can be transferred to the output unit 160. In this case, the ratio of the transformation of the first to fourth transformers T1 to T4 may be variously set. In FIG. 3, a power can be transformed at a ratio of N:1.

In this case, since inputs to the first transformer T1 and the third transformer T3 are the same, currents transformed and output from the first transformer T1 and the third transformer T3 are equally maintained. Accordingly, the quantity of current may be transferred to the output unit 160 through the third rectifying unit D3. The first rectifying unit D1 is not conducted since the quantities of current transformed and output from the first transformer T1 and the third transformer T3 are the same, but all current can be transferred through the third rectifying unit D3.

Meanwhile, during the above operating procedure, since the second transformer T2 and the fourth transformer T4 output no current, the second and fourth transformers T2 and T4 is shorted with respect to the output coils of the output unit 160, and perform an energy charging procedure due to a self-magnetizing inductor. Accordingly, the second transformer T2 and the fourth transformer T4 may perform power filtering due to the self-magnetizing inductor. The DC-DC converter can perform power filtering without a filter inductor, and can perform zero-voltage switching due to the magnetizing inductor energy.

Meanwhile, in the state that the third switch S3 is controlled to be turned on, after the first time for which a period ① is maintained, the third switch S3 may be controlled to be turned off. If the third switch S3 is controlled to be turned off, the input power of the transformer is differently changed, so that the difference between the first output power and the second output power is made due to the first and second modules. Accordingly, current according to the output of the transformer may be distributed and flow even through the first rectifying unit D1 in addition to the third rectifying unit D3. As described above, the off-state of the third switch S3 can be represented in a period of ② FIG. 4. As current flowing through the first rectifying unit D1 is increased, the current flowing through the third rectifying unit D3 may be detected.

Accordingly, if the first rectifying unit D1 is conducted during predetermined time after the third switch S3 has been turned off, the voltage across both terminals of the third transformer may be zero voltage due to current flow. If the voltage across both terminal of the third transformer T3 is zero voltage, the current flowing through the magnetizing inductor of the fourth transformer T4 may conduct the diode of the fourth switch S4 due to the magnetizing inductor energy stored in the fourth transformer T4. Accordingly, voltage cross both terminals of the fourth transformer T4 may be zero voltage.

In addition, if the voltage across both terminal of the forth transformer T4 becomes zero voltage, the controller controls the fourth switch S4 to be turned on, thereby achieving zero-voltage switching between the third switch S3 and the fourth switch S4. Accordingly, the on states of the first and fourth switches S1 and S4 may be represented in a period ③ of FIG. 4.

Thereafter, the controller may control the first switch S1 to be turned off after two hours at which the period ③ is maintained in the state that the fourth switch S4 is turned on. In this case, the state variation of the current may be represented in a period ④ of FIG. 4.

In addition, if the first switch S1 is turned off, the body diode of the second switch S2 may be conducted due to the current flowing through a magnetizing inductor of the second transformer T2 similarly to the case of the fourth transformer T4. The voltage across both terminals of the second switch S2 may be zero voltage due to the current conducted through the body diode of the second switch S2.

Accordingly, when the voltage across both terminals of the second switch S2 is zero voltage, the controller controls the second switch S2 to be turned on, thereby achieving a zero-voltage switching operation between the first switch S1 and the second switch S2. Accordingly, the variation in the switching voltage and the output current, in the period that the second switch S2 and the second switch S4 performs zero-voltage switching so that the second switch S2 and the second switch S4 are turned on, can be represented in a period ⑤ of FIG. 4.

Meanwhile, the first time and the second time may be determined depending on a voltage gain between the power input into the power input unit and the power output from the output unit. Accordingly, the phase in the period in which switching are overlapped is adjusted so that the voltage gain of a desirable voltage can be obtained.

Meanwhile, regarding the description with reference to FIG. 4, all of the first rectifying unit D1, the second rectifying unit D2, and the fourth rectifying unit D4 may be conducted at the period ④. Accordingly, the transition period of the output current may occur. The controller calculates the decrease slop of the output current of each rectifier, and calculates the transition time based on the calculated slope, so that the second switch S2 is turned on after the transition time. Accordingly, the zero-current switching can be achieved with respect to the output current in the rectifying unit.

As described above, the DC-DC converter according to the embodiment enables not only a zero-voltage switching of a main switch at an input stage, but also zero-current switching for a plurality of sync rectifiers at an output stage.

Meanwhile, the entry process to the periods ⑥, ⑦ and ⑧ from the period ⑤ of FIG. 4 is opposite to the periods ①, ②, ⑧, and ④ in the switching schemes and result waveforms. Accordingly, the entry process will be described briefly.

First, after the first time has been elapsed in the state that the second switch S2 is controlled to be turned on, the fourth switch S4 may be controlled to be turned off. In addition, as the fourth switch S4 is turned off, when the current resulting from the magnetizing inductor of the third transformer S3 conducts the body diode of the third switch S3, the third switch S3 is controlled to be turned on, so that the zero-voltage switching can be achieved.

Thereafter, after the second time has been elapsed in the state that the third switch S3 is controlled to be turned on, the second switch S2 may be controlled to be turned off. In addition, as the second switch S2 is turned off, when the current resulting from the magnetizing inductor of the first transformer S1 conducts the body diode of the first switch S1, the first switch S1 is controlled to be turned on, on that the zero-voltage switching can be achieved.

The controller may calculate the decrease slop of the output current and calculate the transition time based on the calculated slope. Accordingly, when the current output from the output unit 160 is zero current, the first switch S1 is controlled to be turned on, thereby achieving the zero-current switch.

As described above, according to the present embodiment, the DC-DC converter performs zero-voltage switching by using energy stored in the magnetizing inductors of the transformers T1, T2, T3, and T4, so that filtering can be performed without an inductor, and the ripple component of the output current can be reduced.

In addition, the input sides of the transforms are connected in series, the output sides of the transformers are connected in parallel, and the magnetizing inductors are used, so that the shortage of the spatial energy at a light load provided in a typical converter performing soft switching can be solved. In addition, the energy shortage in the wide voltage range can be solved.

In addition, the DC-DC converter according to the embodiment enables the zero-voltage switching and the zero-current switching by the sync rectifier using output current, so that the transition time and the effective conductive ratio can be reduced.

In addition, as described above, the controller can performs the zero-voltage switching of the switch and the zero-current switching of the rectifier by using the power handling capacity between the first and second modules, so that the design capacity of a single module can be reduced.

In addition, the transforms may have the same specification. In each module, the primary input stage is connected in series, and the second output stage is connected in parallel, so that the dual structure of the transformer can be included. Accordingly, the performance degradation caused by the deviation and the increase of the transformers can be lowered.

As described above, when a power supply having a high current output structure is designed according to the increase of the output by using the interleaving operation between the first and second modules including a plurality of transformers, the DC-DC converter according to the embodiment can reduce the loss resulting from the number of the turns of an inductor and the size of a core, and a filter can be designed with a low-capacity capacitor. The removal of the large-size element such as an inductor can reduce the design complexity caused when the PCB is patterned or mounted.

Further, in the first and second modules, at least two transformers may be connected in series in the primary side. According to another embodiment, the transforms may be connected in series in the secondary side. According to the embodiment, the series-connection structure is formed at the output side, so that the same voltage gain as that of the full-bridge structure using two half-bridge structures can be obtained. Even if the number of the switches is not increased, the interleaving operation can be performed.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

What is claimed is:

1. A DC-DC converter comprising:
a power input unit to which power is applied;
a first module comprising a first transformer and a second transformer to output a first output power transformed according to operations of a first switch and a second switch connected with the first transformer and the second transformer by using the applied power;
a second module comprising a third transformer and a fourth transformer to output a second output power transformed according to operations of a third switch and a fourth switch connected with the third transformer and the fourth transformer by using the applied power;
an output unit to output a sum of the first output power and the second output power;
a controller to control an interleaving operation between the first module and the second module;
wherein the controller controls the first switch and the third switch to be turned on if the power is applied, and
the first transformer and the third transformer respectively transfer the first output power and the second output power to the output unit to turn off the second switch and the fourth switch, such that the second transformer and the fourth transformer are shorted with respect to the output unit.

2. The DC-DC converter of claim 1, wherein the controller controls the third switch to be turned off in a state that the third switch is turned on, and controls the fourth switch to be turned on if a body diode of the fourth switch is conducted by current from a magnetizing inductor of the fourth transformer.

3. The DC-DC converter of claim 2, wherein the controller changes a state of the third switch from an on-state to an off-state at a time point after a preset first time elapsed.

4. The DC-DC converter of claim 2, wherein the controller controls the first switch to be turned off in a state that the fourth switch is turned on, and controls the first switch to be turned on by conducting a body diode of the second switch by current from a magnetizing inductor of the second transformer if the first switch is turned off.

5. The DC-DC converter of claim 4, wherein the controller changes a state of the first switch to an off-state at a time point after a preset second time elapsed in a state that the fourth switch is turned on.

6. The DC-DC converter of claim 4, wherein the controller controls the fourth switch to be turned off after the first time is elapsed in a state that the second switch is turned on, and controls the third switch to be turned on when conducting a body diode of the third switch by current from a magnetizing inductor of the third transformer as the fourth switch is turned off.

7. The DC-DC converter of claim 6, wherein the controller controls the third switch to be turned off after a second time is elapsed in a state that the third switch is turned on, and controls the first switch to be turned on when conducting a body diode of the first switch by current from a magnetizing inductor of the first transformer as the second switch is turned off.

8. The DC-DC converter of claim 1, wherein the controller controls a change of a state of the switch according to a voltage gain between the power input to the power input unit and a power output from the output unit.

9. The DC-DC converter of claim 1, wherein the first module includes a first rectifying unit to rectify an output of the first transformer and a second rectifying unit to rectify an output of the second transformer, the second module includes a third rectifying unit to rectify an output of the third transformer and a fourth rectify unit to rectify an output of the fourth transformer, and the first to fourth rectifying units include at least one of a synchronization rectifying switch and a diode rectifying unit.

10. The DC-DC converter of claim 9, further comprising a filter unit connected with the first to fourth rectifying units to filter outputs of the first to fourth rectifying units and transfer the filtered outputs of the first to fourth rectifying units to the output unit, wherein the filter unit comprises a capacitor.

11. The DC-DC converter of claim 1, wherein coils at input sides of the first transformer and the second transformer are connected to the power input unit in series, and coils at output sides thereof are connected with the output unit in parallel.

12. The DC-DC converter of claim 1, wherein coils at input sides of the third transformer and the fourth transformer are connected to the power input unit in series, and coils at output sides thereof are connected with the power output unit.

13. A DC-DC converter comprising:

a power input unit to which a DC power is applied;

a first switch having one terminal connected with a positive terminal of the power input unit, and an opposite terminal connected with a second switch connected with a negative electrode of the power input unit;

a third switch having one terminal connected with the positive terminal of the power input unit, and an opposite terminal connected with a fourth switch connected with the negative electrode of the power input unit;

a first transformer, a second transformer, a fourth transformer, and a third transformer having input coils connected in series between a first connection point, at which the first switch and the second switch are connected with other, and a second connection point at which the third switch and the fourth switch are connected with each other;

an output unit to output converted DC power; and a controller configured to control the first switch and the third switch to be turned on if the power is applied, and the first transformer and the third transformer respectively transfer the first output power and the second output power to the output unit to turn off the second switch and the fourth switch, such that the second transformer and the fourth transformer are shorted with respect to the output unit.

14. The DC-DC converter of claim 13, wherein output coils of the first to fourth transformers are connected with both terminals of the output unit through the first to fourth transformers in parallel, and the control unit is configured to perform zero-voltage switching with respect to the first to fourth switches.

\* \* \* \* \*